United States Patent
Narayanaswamy et al.

(10) Patent No.: US 11,570,367 B2
(45) Date of Patent: Jan. 31, 2023

(54) METHOD AND ELECTRONIC DEVICE FOR INTELLIGENT CAMERA ZOOM

(71) Applicant: Samsung Electronics Co., Ltd., Suwon-si (KR)

(72) Inventors: Santhosh Kumar Banadakoppa Narayanaswamy, Bengaluru (IN); Kiran Nanjunda Iyer, Bengaluru (IN); Sai Krishna Kasibhotla, Bengaluru (IN); Biplab Ch Das, Bengaluru (IN); Moneish Kumar, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/302,673

(22) Filed: May 10, 2021

(65) Prior Publication Data
US 2022/0217279 A1 Jul. 7, 2022

(30) Foreign Application Priority Data
Jan. 6, 2021 (IN) .............................. 202141000607

(51) Int. Cl.
*H04N 5/232* (2006.01)
*G06N 3/08* (2006.01)

(52) U.S. Cl.
CPC ........... *H04N 5/23296* (2013.01); *G06N 3/08* (2013.01); *H04N 5/23212* (2013.01);
(Continued)

(58) Field of Classification Search
CPC ......... H04N 5/23296; H04N 5/232945; H04N 5/23218; H04N 5/232933;
(Continued)

(56) References Cited

U.S. PATENT DOCUMENTS 8,526,804 B2 9/2013 Morimoto
8,823,837 B2 9/2014 Kim
(Continued)

FOREIGN PATENT DOCUMENTS

CN 107749952 A 3/2018
CN 107896303 A 4/2018
(Continued)

OTHER PUBLICATIONS

International Search Report and Written Opinion of the International Searching Authority dated Oct. 1, 2021, in connection with International Application No. PCT/KR2021/006275, 7 pages.
(Continued)

*Primary Examiner* — Antoinette T Spinks

(57) ABSTRACT

A method for displaying an intelligent zoom recommendation in an electronic device includes displaying a scene comprising a plurality of objects in a preview frame of at least one imaging sensor of the electronic device. The method also includes determining a preference for each of the objects by mapping each of the objects into a preference database of the electronic device. The method further includes determining a position of each of the objects in the preview frame of the at least one imaging sensor of the electronic device. Additionally, the method includes selecting at least one object from the plurality of objects based on the preference and the position of each of the objects. The method also includes displaying at least one graphical indication to zoom the at least one selected object in the preview frame of the at least one imaging sensor of the electronic device.

20 Claims, 10 Drawing Sheets

(52) U.S. Cl.
CPC ... *H04N 5/23218* (2018.08); *H04N 5/232933* (2018.08); *H04N 5/232941* (2018.08); *H04N 5/232945* (2018.08)

(58) Field of Classification Search
CPC ......... H04N 5/232941; H04N 5/23212; H04N 5/23222; G06N 3/08
See application file for complete search history.

(56) References Cited

U.S. PATENT DOCUMENTS

| | | |
|---|---|---|
| 2009/0109243 A1 | 4/2009 | Kraft et al. |
| 2009/0207310 A1* | 8/2009 | Arai .......................... G06T 3/40 348/581 |
| 2013/0016255 A1 | 1/2013 | Bhatt |
| 2015/0138390 A1 | 5/2015 | Tomosada |
| 2016/0191811 A1 | 6/2016 | Tsubusaki |
| 2017/0302719 A1* | 10/2017 | Chen ..................... H04N 19/33 |
| 2018/0270426 A1 | 9/2018 | Ogawa |
| 2018/0285652 A1 | 10/2018 | Dey et al. |
| 2019/0132522 A1 | 5/2019 | Tsubusaki |
| 2019/0139195 A1 | 5/2019 | Lee et al. |
| 2019/0213710 A1 | 7/2019 | Roulet et al. |
| 2019/0281223 A1* | 9/2019 | Kelly ................. H04N 5/23296 |
| 2020/0106953 A1 | 4/2020 | Suzuki et al. |

FOREIGN PATENT DOCUMENTS

| | | |
|---|---|---|
| JP | 2011-211757 A | 10/2011 |
| KR | 10-1222928 B1 | 1/2013 |
| KR | 10-2020-0071799 A | 6/2020 |

OTHER PUBLICATIONS

Office Action dated Aug. 1, 2022 in connection with India Patent Application No. 202141000607, 7 pages.

* cited by examiner

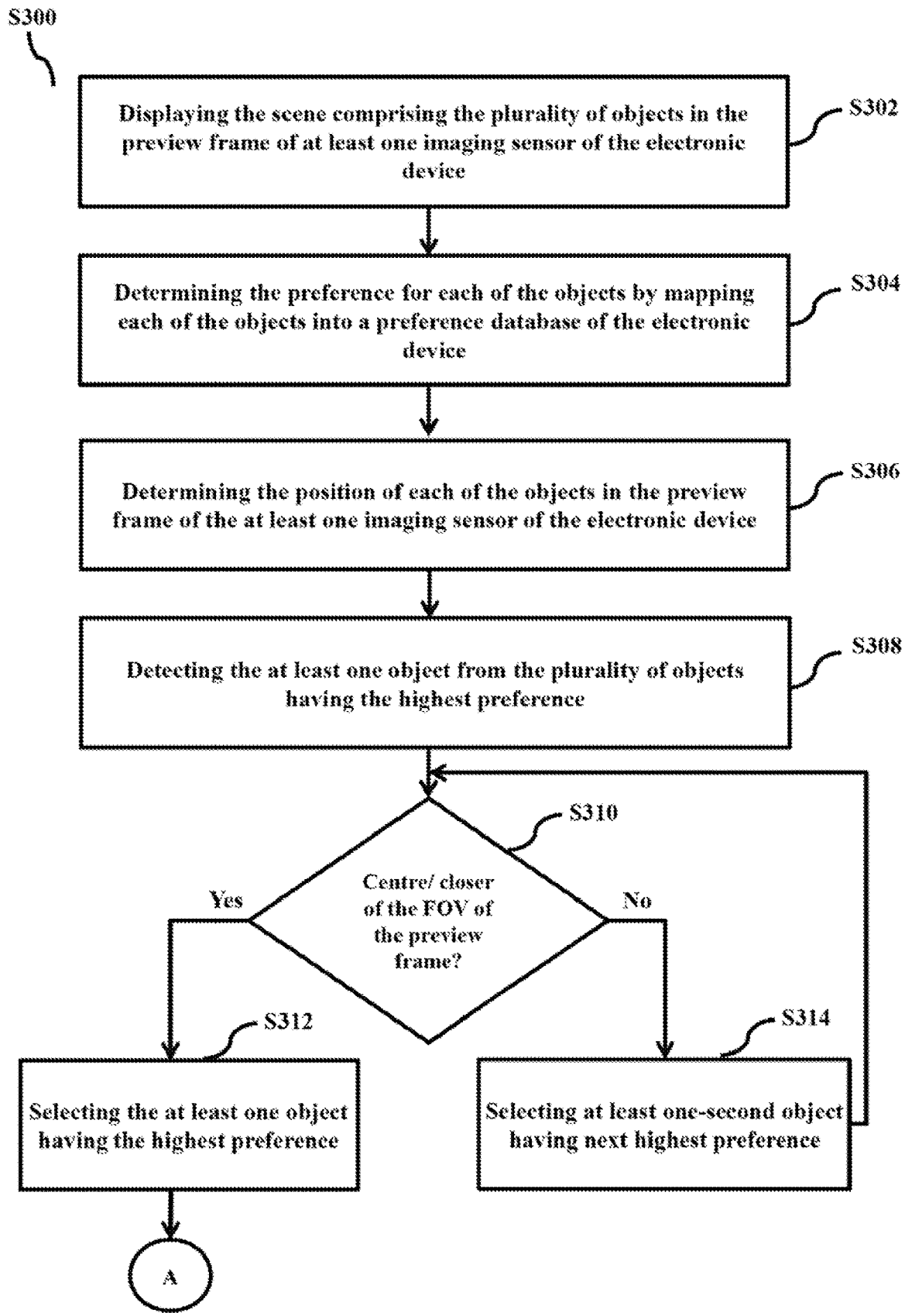

METHOD AND ELECTRONIC DEVICE FOR INTELLIGENT CAMERA ZOOM

CROSS-REFERENCE TO RELATED APPLICATION

This application is based on and claims priority under 35 U.S.C. § 119 to Indian Patent Application No. 202141000607, filed on Jan. 6, 2021, in the Indian Intellectual Property Office, the disclosure of which is incorporated by reference herein in its entirety.

BACKGROUND

1. Field

The present disclosure relates to image processing, and more specifically related to a method and electronic device for displaying an intelligent zoom recommendation in the electronic device.

2. Description of Related Art

In general, functionalities of an electronic device are increasing rapidly, the electronic device such as smartphone, tablet, computer, and more are capable of running applications that perform different tasks (e.g. as capturing pictures, screenshots, web browsing, watching a movie, booking tickets for an event, and call recording) and provide different types of information. Furthermore, each application has various features. For example, a camera application of the electronic device has various features such as auto-focus, auto-exposure, auto white-balance, auto-flash mode, face recognition, zoom, and more.

SUMMARY

The principal object of the embodiments herein is to enhance zoom experience by utilizing multiple cameras feeds of an electronic device parallelly based on a learning of intention/behaviour of a user of the electronic device over a time period.

Another object of the embodiment herein is to provide smooth zooming at a higher scale of a camera application of the electronic device.

Another object of the embodiment herein is to provide zooming suggestion intelligently by using a single click feature of the camera application of the electronic device.

Accordingly, embodiments herein disclose a method and electronic device for displaying an intelligent zoom recommendation in an electronic device. The method includes displaying, by the electronic device, a scene comprising a plurality of objects in a preview frame of an imaging sensor of the electronic device. Further, the method includes determining, by the electronic device, a preference for each of the objects by mapping each of the objects into a preference database of the electronic device, wherein the preference database comprises information about different objects and corresponding preference. Further, the method includes determining, by the electronic device, a position of each of the objects in the preview frame of the imaging sensor of the electronic device. Further, the method includes selecting, by the electronic device, an object from the plurality of objects based on the preference and the position of each of the objects. Further, the method includes displaying, by the electronic device, a graphical indication to zoom the selected object in the preview frame of the imaging sensor of the electronic device.

Further, the method includes detecting, by the electronic device, a zoom-in operation performed to zoom the selected object. Further, the method includes detecting, by the electronic device, whether a portion of the selected object is going beyond a field of view (FOV) of the preview frame of the image sensor of the electronic device. Further, the method includes automatically displaying, by the electronic device, an alert to stop performing the zoom-in operations in response to determining that the portion of the selected object is going beyond the FOV of the preview frame of the image sensor of the electronic device.

Further, the method includes detecting, by the electronic device, the object from the plurality of objects having a highest preference. Further, the method includes determining, by the electronic device, whether the object having the highest preference is one of: in center of the FOV of the preview frame, and closer to the center of the FOV of the preview frame in comparison to remaining objects from the plurality of objects. Further, the method includes selecting the object having the highest preference in response to determining that the object is one of: in center of the FOV of the preview frame, and closer to the center of the FOV of the preview frame in comparison to the remaining objects from the plurality of objects. Further, the method includes selecting a second object having the next highest preference and is one of: in center of the FOV of the preview frame and is closer to the center of the FOV of the preview frame in comparison to the remaining objects from the plurality of objects, in response to determining that the object having the highest preference is one of: not in the center of the FOV of the preview frame, and not closer to the center of the FOV of the preview frame in comparison to the remaining objects from the plurality of objects.

Further, the method includes drawing a bounding box around a portion of the selected object. Further, the method includes applying a visual effect on a portion of the selected object. Further, the method includes displaying a ticker corresponding to the selected object.

Further, the method includes monitoring, by the electronic device, a plurality of images including a plurality of objects captured by a user of the electronic device over a period of time. Further, the method includes generating, by the electronic device, a preference value for each the object based on at least one of an object detection, an object recognition a frequency of capture, a semantic relationship among the objects and a plurality of capture parameters associated with each image. Further, the method includes storing, by the electronic device, the preference database.

Further, the method includes the plurality of capture parameters associated with each image comprises a configuration of the imaging sensor, a mode applied to capture the images, an effect applied while capturing the images.

Accordingly, the embodiments herein provide the electronic device for displaying an intelligent zoom recommendation in the electronic device. The electronic device includes an intelligent zoom controller coupled with a processor and a memory. The intelligent zoom controller is configured to display the scene comprising the plurality of objects in the preview frame of the imaging sensor of the electronic device. Further, the intelligent zoom controller is configured to determine the preference for each of the objects by mapping each of the objects into the preference database of the electronic device, where the preference database comprises information about different objects and corresponding preferences. Further, the intelligent zoom controller is configured to determine the position of each of the objects in the preview frame of the imaging sensor of the electronic device. Further, the intelligent zoom controller is configured to select the object from the plurality of objects based on the preference and the position of each of the objects. Further, the intelligent zoom controller is configured to display the graphical indication to zoom the selected object in the preview frame of the imaging sensor of the electronic device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

This method and electronic device are illustrated in the accompanying drawings, throughout which like reference letters indicate corresponding parts in the various figures. The embodiments herein will be better understood from the following description with reference to the drawings, in which:

FIG. 3A and FIG. 3B illustrate flow diagrams of a method for displaying the intelligent zoom recommendation in the electronic device, according to an embodiment of this disclosure;

DETAILED DESCRIPTION

Figure 1:
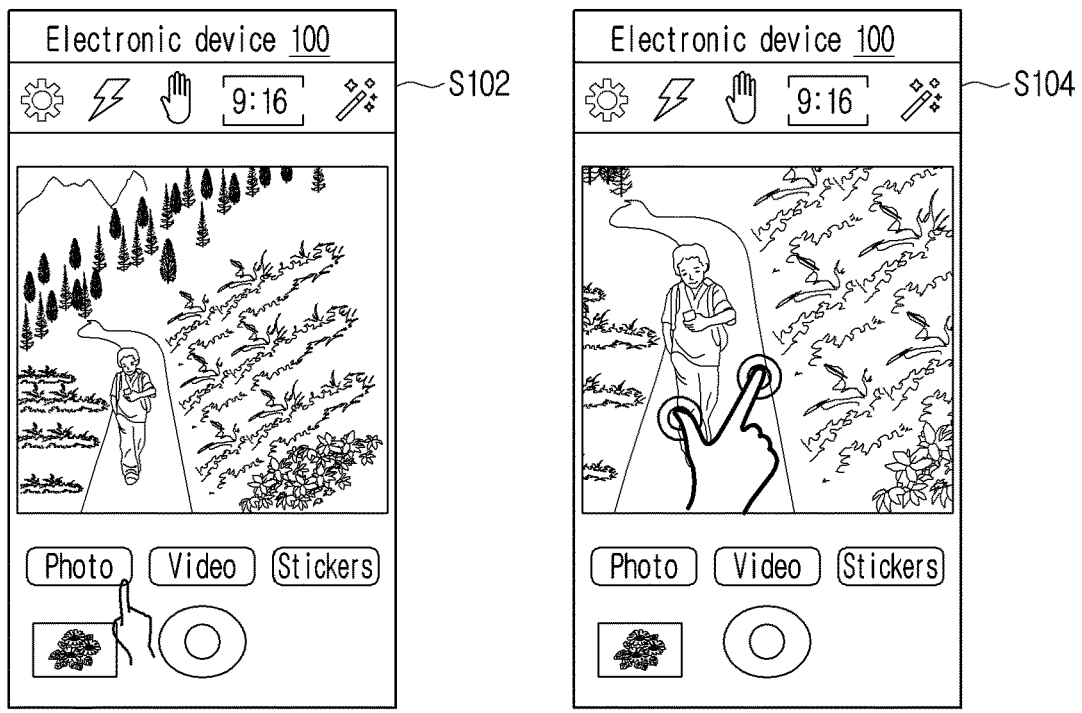
FIG. 1 illustrates an example scenario in which a user of an electronic device manually selects a zoom level of a camera application of the electronic device, according to an embodiment of this disclosure.
Figure 1:
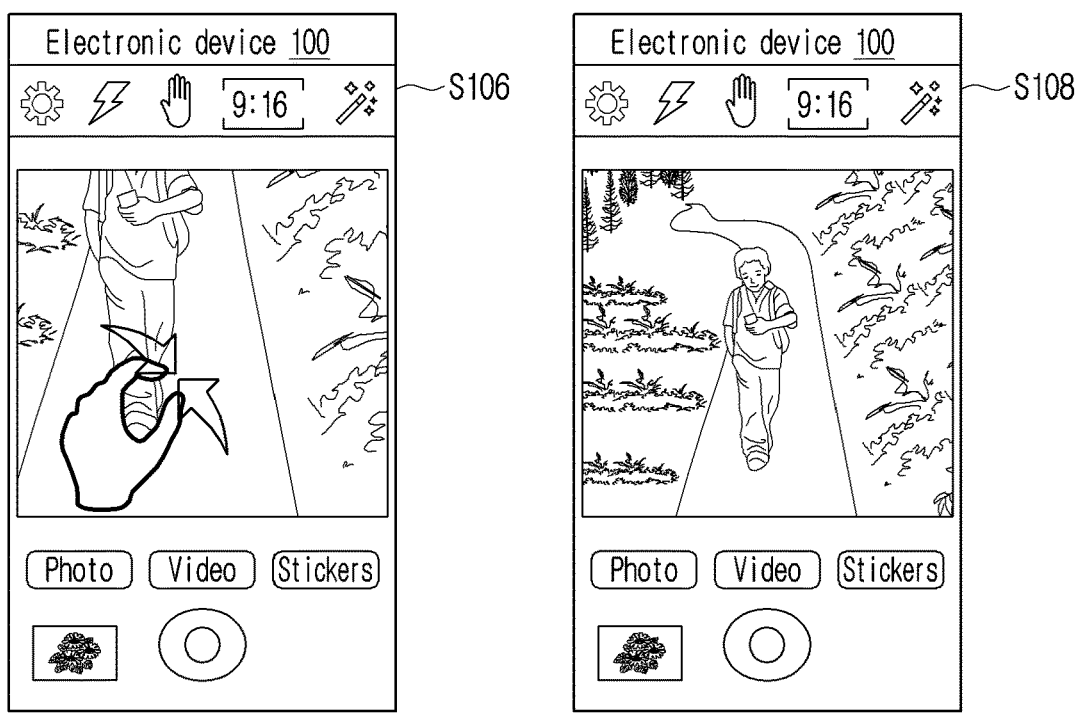

FIGS. 1 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of this disclosure. Likewise, the blocks of the embodiments may be physically combined into more complex blocks without departing from the scope of this disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method and electronic device for displaying an intelligent zoom recommendation in an electronic device. The method includes displaying, by the electronic device, a scene comprising a plurality of objects in a preview frame of an imaging sensor of the electronic device. Further, the method includes determining, by the electronic device, a preference for each of the objects by mapping each of the objects into a preference database of the electronic device, wherein the preference database comprises information about different objects and corresponding preference. Further, the method includes determining, by the electronic device, a position of each of the objects in the preview frame of the imaging sensor of the electronic device. Further, the method includes selecting, by the electronic device, an object from the plurality of objects based on the preference and the position of each of the objects. Further, the method includes displaying, by the electronic device, a graphical indication to zoom the selected object in the preview frame of the imaging sensor of the electronic device.

Accordingly, the embodiments herein provide the electronic device for displaying the intelligent zoom recommendation in the electronic device. The electronic device includes an intelligent zoom controller coupled with a processor and a memory. The intelligent zoom controller is configured to display the scene comprising the plurality of objects in the preview frame of the imaging sensor of the electronic device. Further, the intelligent zoom controller is configured to determine the preference for each of the objects by mapping each of the objects into the preference database of the electronic device, where the preference database comprises information about different objects and corresponding preferences. Further, the intelligent zoom controller is configured to determine the position of each of the objects in the preview frame of the imaging sensor of the electronic device. Further, the intelligent zoom controller is configured to select the object from the plurality of objects based on the preference and the position of each of the objects. Further, the intelligent zoom controller is configured to display the graphical indication to zoom the selected object in the preview frame of the imaging sensor of the electronic device.

Unlike existing methods and systems, the proposed method and electronic device can be used to enhance zoom experience by utilizing multiple cameras feeds of an electronic device parallelly based on a learning of intention/behaviour of a user of the electronic device over a time period.

Unlike existing methods and systems, the proposed method and electronic device can be used to provide smooth zooming at a higher scale of a camera application of the electronic device and provide zooming suggestion intelligently by using a single click feature of the camera application of the electronic device.

FIG. 1 illustrates an example scenario in which a user of an electronic device manually selects a zoom level of a camera application of the electronic device, according to an embodiment of this disclosure. As shown in the FIG. 1, consider a scenario (S102) where the user has to take a picture of a walking person using the camera applications of the electronic device and the user uses less background detail of the picture. So, that time the user manually pinch in for zoom-in operation (S104) and pinch out for zoom-out operation (S106) to get only the walking person. Furthermore, the electronic device usually zoom towards center of a camera field of view (FoV). But in real time scenario, it may not necessary every time the user wants/intention to zoom towards center of the camera FoV, it can be a corner or other part of the picture also. Furthermore, the electronic device uses the manual process to zoom-in and zoom-out which is time-consuming and because of that precious moments to capture the picture may be lost (e.g. walking person may go out of camera FoV). The manual process may hamper user experience to capture a perfect picture (S108) with an optimal zoom level, the optimal zoom level where region of interest (RoI) (e.g. walking person) within camera FoV. Embodiments of present disclosure take into consideration that there is no mechanism that recognizes an intention/a behavior of the user of the electronic device and enhancing the probability of recommendation of the optimal zoom level. Therefore embodiments of the present disclosure provide an intelligent solution to automatically decide the optimal zoom level with minimal user interaction.

Figure 2A:
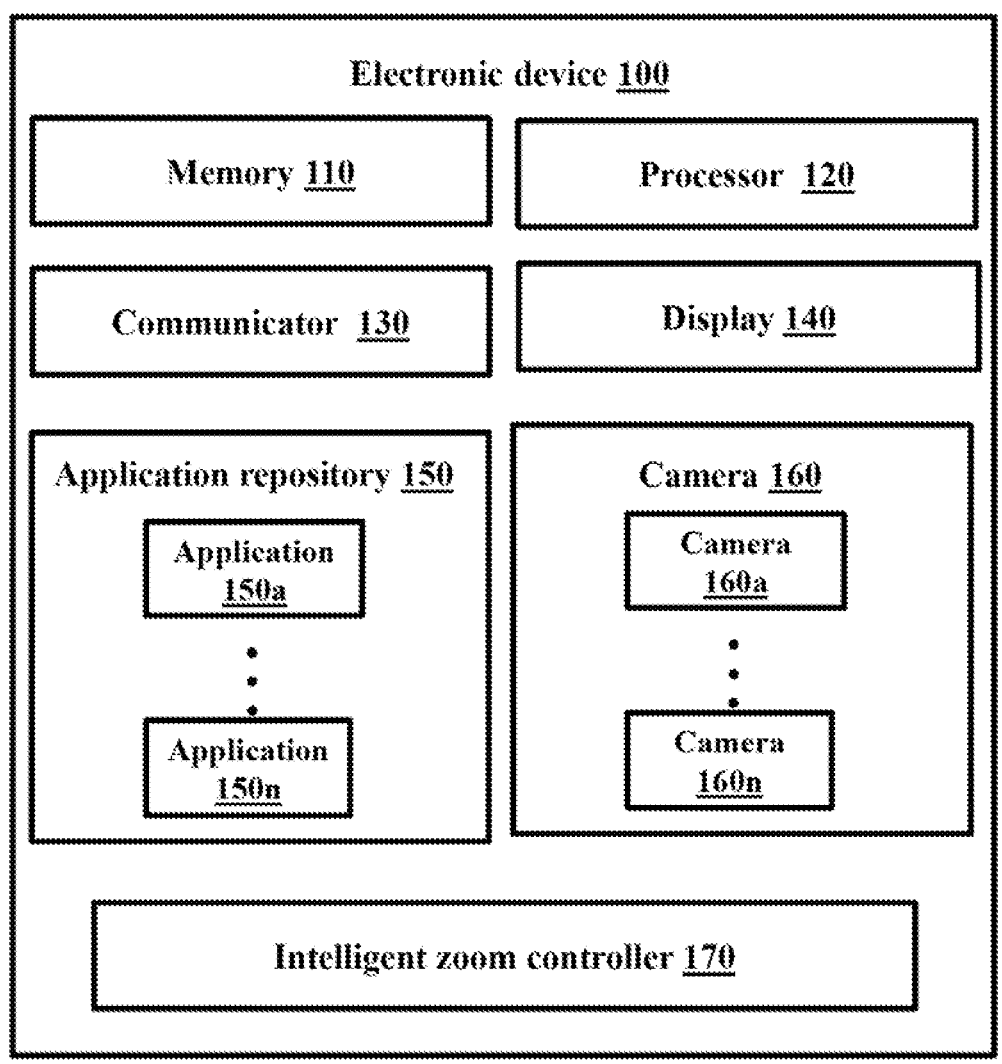
FIG. 2A illustrates a block diagram of the electronic device for displaying an intelligent zoom recommendation in the electronic device, according to an embodiment of this disclosure.

FIG. 2A illustrates a block diagram of the electronic device (100) for displaying the intelligent zoom recommendation in the electronic device (100), according to an embodiment as disclosed herein. The electronic device (100) can be, for example, but not limited, to a smart phone, a laptop, a smart television (TV), web cameras, modern digital pocket cameras, digital single-lens reflex cameras (DSLRs).

In an embodiment, the electronic device (100) includes a memory (110), a processor (120), a communicator (130), a display (140), an application repository (150), a camera (160), and an intelligent zoom controller (170).

The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the electronic device (100), a cloud storage, or any other type of external storage. The memory (110) stores a preference database associated with the application repository (150), where the preference database comprises information about different objects and corresponding preference.

The processor (120) communicates with the memory (110), the communicator (130), the display (140), the application repository (150), the camera (160), and the intelligent zoom controller (170). The processor (120) is configured to execute instructions stored in the memory (110) and to perform various processes. The processor may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) is configured for communicating internally between internal hardware components (e.g. the memory (110), the processor (120), the display (140), the application repository (150), the camera (160), and the intelligent zoom controller (170)) and with external devices via one or more networks. The communicator (130) includes an electronic circuit specific to a standard that enables wired or wireless communication.

The application repository (150) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The application repository (150) is configured to store a preference database corresponding to each application (e.g. camera application, gallery application, social network application) of the electronic device (100). The application repository (150) includes a plurality of application (150a) to application (150n). Examples for the application repository (150) are, but not limited, to a media application, a web application, a video player application, a camera application, a game application, a business application, an education application, a lifestyle application, an entertainment application, a utility application, a travel application, etc. The camera (160) displays a preview of a scene on the screen (i.e. display (140)) of the electronic device (100) by utilizing multiple cameras feeds of the electronic device (100). The multiple cameras (160) includes a primary imaging sensor (160a) (e.g. primary camera) and a secondary imaging sensor (160b-160n) (e.g. secondary camera). The scene comprising a plurality of objects (e.g. tree, house, road, cloud, mountain, flower, pet, etc.) in a preview frame of an imaging sensor of the camera (160) of the electronic device (100).

The intelligent zoom controller (170) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the intelligent zoom controller (170) is configured to display a scene comprising a plurality of objects in a preview frame of an imaging sensor of the electronic device (100). Further, the intelligent zoom controller (170) is configured to determine a preference for each of the objects by mapping each of the objects into a preference database of the electronic device (100), where the preference database comprises information about different objects and corresponding preference.

Further, the intelligent zoom controller (170) is configured to determine a position of each of the objects in the preview frame of the imaging sensor of the electronic device (100). Further, the intelligent zoom controller (170) is configured to select a object from the plurality of objects based on the preference and the position of each of the objects. Further, the intelligent zoom controller (170) is configured to display a graphical indication to zoom the selected object in the preview frame of the imaging sensor of the electronic device (100).

Further, the intelligent zoom controller (170) is configured to detect a zoom-in operation performed to zoom the selected object. Further, the intelligent zoom controller (170) is configured to detect whether a portion of the selected object is going beyond a field of view (FOV) of the preview frame of the image sensor of the electronic device (100). Further, the intelligent zoom controller (170) is configured to automatically display an alert to stop performing the zoom-in operations in response to determining that the portion of the selected object is going beyond the FOV of the preview frame of the image sensor of the electronic device (100).

Further, the intelligent zoom controller (170) is configured to detect the object from the plurality of objects having a highest preference. Further, the intelligent zoom controller (170) is configured to determine whether the object having the highest preference is one of: in center of the FOV of the preview frame, and closer to the center of the FOV of the preview frame in comparison to remaining objects from the plurality of objects.

Further, the intelligent zoom controller (170) is configured to select the object having the highest preference in response to determining that the object is one of: in center of the FOV of the preview frame, and closer to the center of the FOV of the preview frame in comparison to the remaining objects from the plurality of objects. Further, the intelligent zoom controller (170) is configured to select-second object having next highest preference and is one of: in center of the FOV of the preview frame and is closer to the center of the FOV of the preview frame in comparison to the remaining objects from the plurality of objects, in response to determining that the object having the highest preference is one of: not in the center of the FOV of the preview frame, and not closer to the center of the FOV of the preview frame in comparison to the remaining objects from the plurality of objects.

Further, the intelligent zoom controller (170) is configured to draw a bounding box around a portion of the selected object. Further, the intelligent zoom controller (170) is configured to apply a visual effect on a portion of the selected object. Further, the intelligent zoom controller (170) is configured to display a ticker corresponding to the selected object.

Further, the intelligent zoom controller (170) is configured to monitor a plurality of images including a plurality of objects captured by a user of the electronic device (100) over a period of time. Further, the intelligent zoom controller (170) is configured to generate a preference value for each the object based on at least one of an object detection, an object recognition, t a frequency of capture, a semantic relationship among the objects, and a plurality of capture parameters associated with each image. Further, the intelligent zoom controller (170) is configured to store the preference database.

Figure 2B:
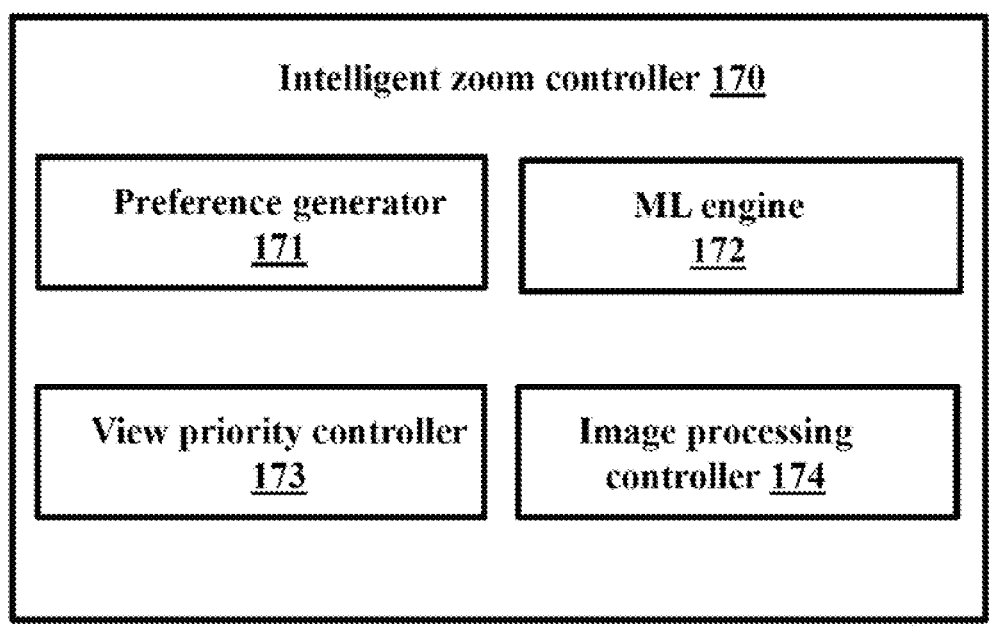
FIG. 2B illustrates a block diagram of an intelligent zoom controller for displaying an intelligent zoom recommendation in the electronic device, according to an embodiment of this disclosure.

FIG. 2B illustrates a block diagram of an intelligent zoom controller for displaying an intelligent zoom recommendation in the electronic device, according to an embodiment of this disclosure.

In an embodiment, the intelligent zoom controller (170) includes a preference generator (171), a Machine Learning (ML) engine (172), a view priority controller (173), and an image processing controller (174).

The preference generator (171) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The preference generator (171) determines the preference for each of the objects by mapping each of the objects into the preference database of the electronic device (100) using the ML engine (172).

The ML engine (172) is implemented by processing circuitry such as logic gates, integrated circuits, microprocessors, microcontrollers, memory circuits, passive electronic components, active electronic components, optical components, hardwired circuits, or the like, and may optionally be driven by firmware and. The circuits may, for example, be embodied in one or more semiconductor chips, or on substrate supports such as printed circuit boards and the like.

The ML engine (172) monitors a plurality of images including a plurality of objects captured by a user of the electronic device (100) over a period of time. Further, the ML engine (172) draws multiple correlations of each object in the image in connection with a frequency of capture, a semantic relationship among the objects, and a plurality of capture parameters associated with each image using a user-specific neural network model (e.g. artificial neural network (ANN), deep neural network (DNN), object detection, object recognition, etc.). Further, the ML engine (172) generates a preference value (e.g. pet score: "6", flower score: "2", car score: "7", etc.) for each object based on the multiple correlations of each object in the image in connection with the frequency of capture, the semantic relationship among the objects and the plurality of capture parameters associated with each image. The plurality of capture parameters associated with each image comprises a configuration of the imaging sensor (e.g. charge-coupled device (CCD) and the active-pixel sensor (CMOS sensor), fabricated in complementary MOS (CMOS)), a mode (e.g. selfie mode, auto-focus mode, professional mode) applied to capture the images, an effect (e.g. bokeh, beauty) applied while capturing the images. Further, the ML engine (172) stores the preference database.

The view priority controller (173) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The view priority controller (173) detects the object from the plurality of objects having the highest preference using the ML engine (172). Further, the view priority controller (173) determines whether the object having the highest preference is one of: in center of the FOV of the preview frame, and closer to the center of the FOV of the preview frame in comparison to the remaining objects from the plurality of objects. Further, the view priority controller (173) selects the object having the highest preference in response to determining that the object is one of: in center of the FOV of the preview frame, and closer to the center of the FOV of the preview frame in comparison to the remaining objects from the plurality of objects. Further, the view priority controller (173) selects a second object having next highest preference and is one of: in center of the FOV of the preview frame and is closer to the center of the FOV of the preview frame in comparison to the remaining objects from the plurality of objects, in response to determining that the object having the highest preference is one of: not in the center of the FOV of the preview frame, and not closer to the center of the FOV of the preview frame in comparison to the remaining objects from the plurality of objects.

The image processing controller (174) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like The image processing controller (174) performs a zoom-in operation towards the selected object, where the object selected by the view priority controller (173). Further, the image processing controller (174) detects whether the portion of the selected object is going beyond the FOV of the preview frame of the image sensor of the camera (160) of the electronic device (100). Further, the image processing controller (174) automatically displays an alert to stop performing the zoom-in operations in response to determining that the portion of the selected object is going beyond the FOV of the preview frame of the image sensor of the camera (160) of the electronic device (100). Further, the image processing controller (174) draws a bounding box around a portion of the selected object. Further, the image processing controller (174) applies a visual effect on a portion of the selected object. Further, the image processing controller (174) displays a ticker corresponding to the selected object.

At least one of the plurality of modules may be implemented through an artificial intelligence (AI) model. A function associated with the AI model may be performed through the non-volatile memory, the volatile memory, and the processor (120). The one or a plurality of processors controls the processing of the input data in accordance with a predefined operating rule or AI model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may consist of a plurality of neural network layers. Each layer has a plurality of weight values and performs a layer operation through a calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to decide or predict. Examples of learning algorithms include, but are not limited to, supervised learning, unsupervised learning, semi-supervised learning, or reinforcement learning.

Although the FIGS. 2A and 2B show various hardware components of the electronic device (100) it is to be understood that other embodiments are not limited thereon. In other embodiments, the electronic device (100) may include less or more number of components. Further, the labels or names of the components are used only for illustrative purpose and does not limit the scope of this disclosure. One or more components can be combined together to perform same or substantially similar function to display the intelligent zoom recommendation in the electronic device (100).

FIG. 3A illustrates a flow diagram (S300) of a method for displaying the intelligent zoom recommendation in the electronic device (100), according to an embodiment of this disclosure.

Referring to the FIG. 3A, At S302, the method includes displaying, by the camera (160), the preview of the scene comprising the plurality of objects in the preview frame of the imaging sensor of the camera (160) of the electronic device (100). At S304, the method includes determining, by the preference generator (171), the preference for each of the objects by mapping each of the objects into the preference database of the electronic device (100). At S306, the method includes determining, by the view priority controller (173), the position of each of the objects in the preview frame of the imaging sensor of the camera (160) of the electronic device (100). At S308, the method includes detecting, by the view priority controller (173), the object from the plurality of objects having the highest preference.

At S310, the method includes determining, by the view priority controller (173), whether the object having the highest preference is one of: in center of the FOV of the preview frame, and closer to the center of the FOV of the preview frame in comparison to remaining objects from the plurality of objects. At S312, the method includes selecting, by the view priority controller (173), the object having the highest preference in response to determining that the object is one of: in center of the FOV of the preview frame, and closer to the center of the FOV of the preview frame in comparison to the remaining objects from the plurality of objects. At S314, the method includes selecting, by the view priority controller (173), a second object having the next highest preference and is one of: in center of the FOV of the preview frame and is closer to the center of the FOV of the preview frame in comparison to the remaining objects from the plurality of objects, in response to determining that the object having the highest preference is one of: not in the center of the FOV of the preview frame, and not closer to the center of the FOV of the preview frame in comparison to the remaining objects from the plurality of objects.

Figure 3B:
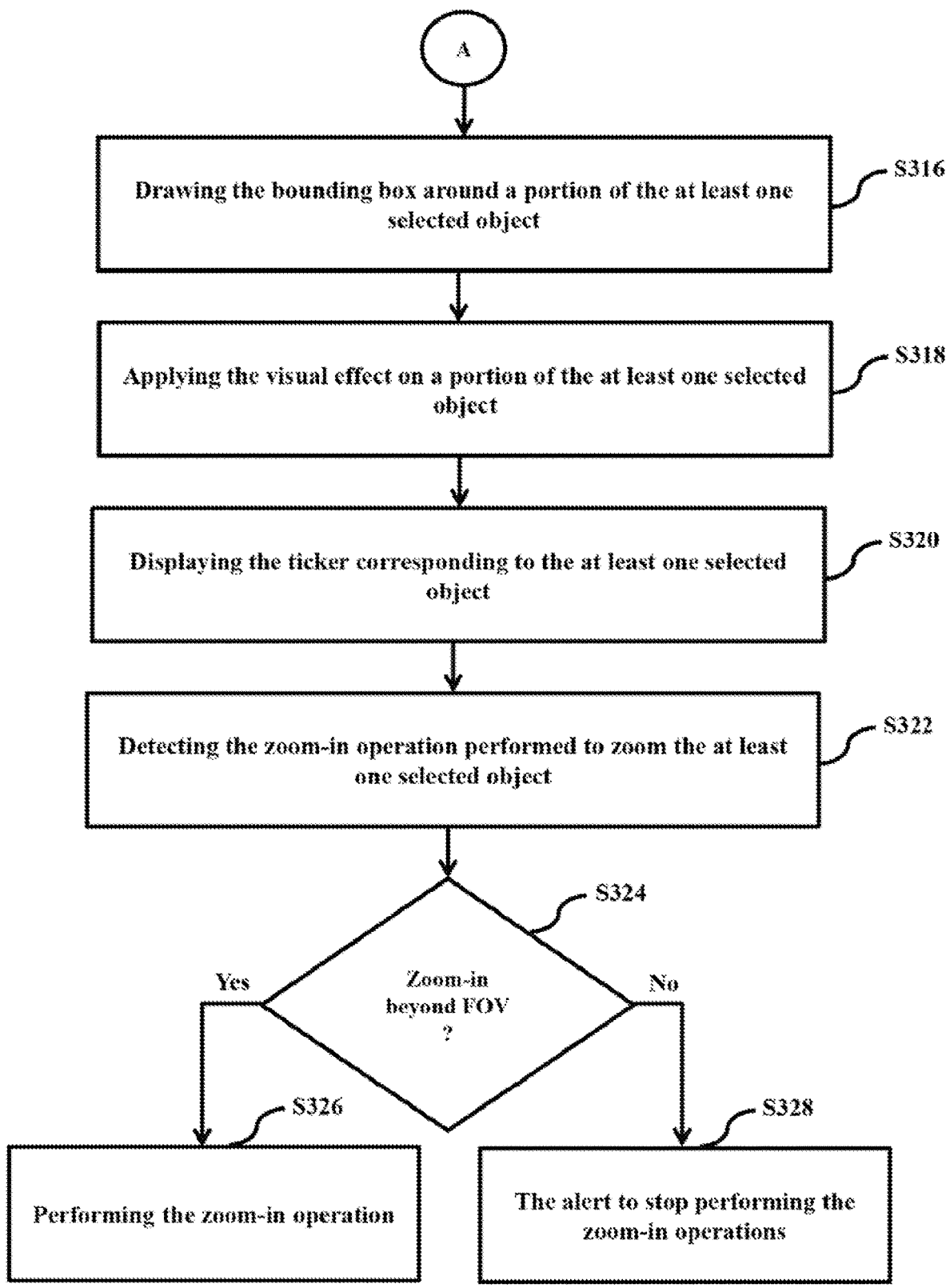

Referring to FIG. 3B, At S316, the method includes drawing, by the image processing controller (174), the bounding box around the portion of the selected object. At S318, the method includes applying the visual effect on a portion of the selected object. At S320, the method includes displaying, by the image processing controller (174), the ticker corresponding to the selected object. At S322, the method includes detecting, by the image processing controller (174), the zoom-in operation performed to zoom the selected object. At S324, the method includes detecting, by the image processing controller (174), whether the portion of the selected object is going beyond the FOV of the preview frame of the image sensor of the electronic device (100). At S326, the method includes performing, by the image processing controller (174), the zoom-in operation in response to detecting that the portion of the selected object is going beyond the FOV of the preview frame of the image sensor of the electronic device (100). At S328, the method includes automatically displaying, by the image processing controller (174), the alert to stop performing the zoom-in operations in response to determining that the portion of the selected object is going beyond the FOV of the preview frame of the image sensor of the camera (160) of the electronic device (100).

The various actions, acts, blocks, steps, or the like in the flow diagram (S300) may be performed in the order presented, in a different order, or simultaneously. Further, in some embodiments, some of the actions, acts, blocks, steps, or the like may be omitted, added, modified, skipped, or the like without departing from the scope of this disclosure.

Figure 4A:
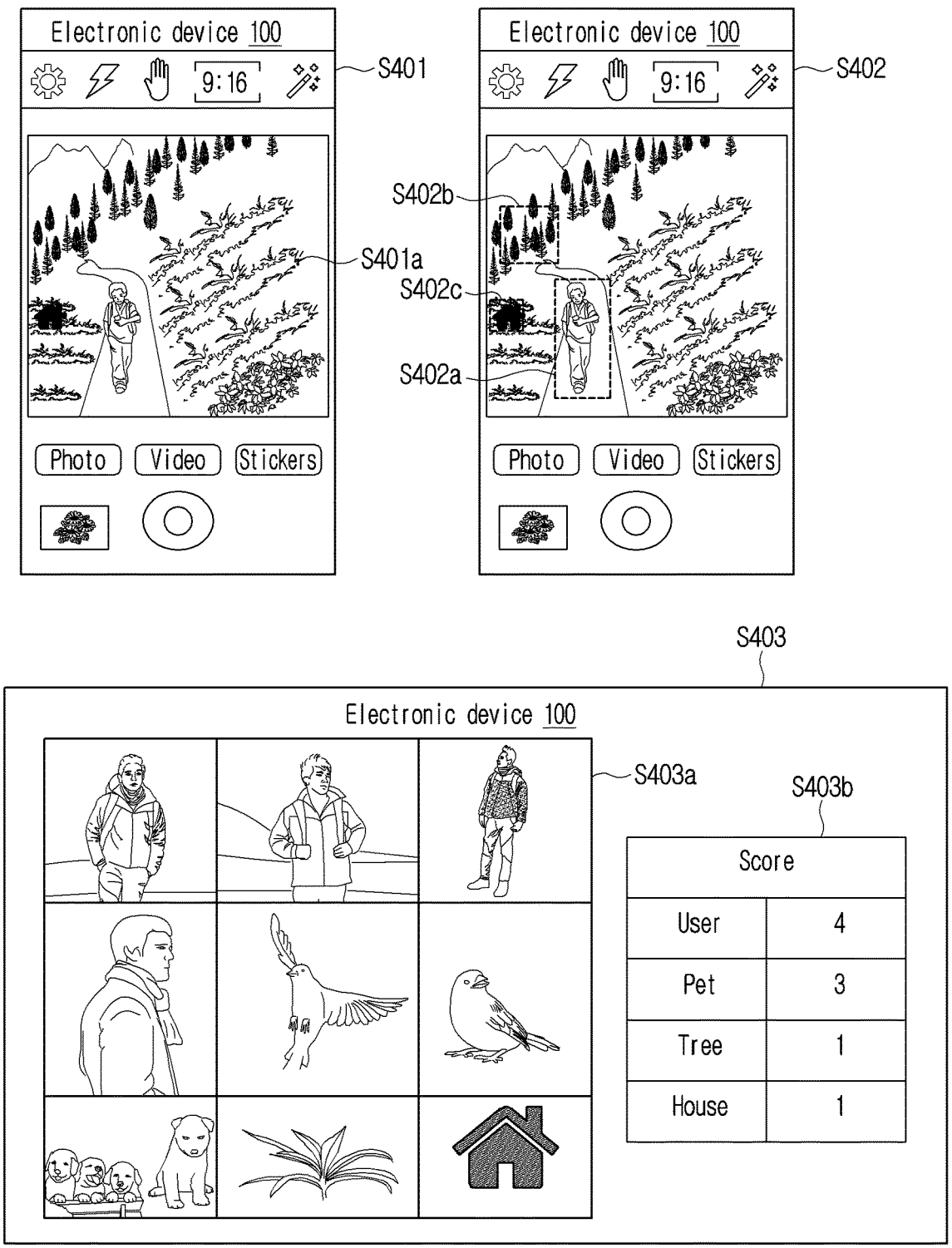
FIG. 4A and FIG. 4B illustrate example diagrams in which a zoom suggestion is derived from a user-specific neural network model, when one object having a highest preference and closer to the center of a Field of view (FOV) of a preview frame, according to an embodiment of this disclosure.
Figure 4B:
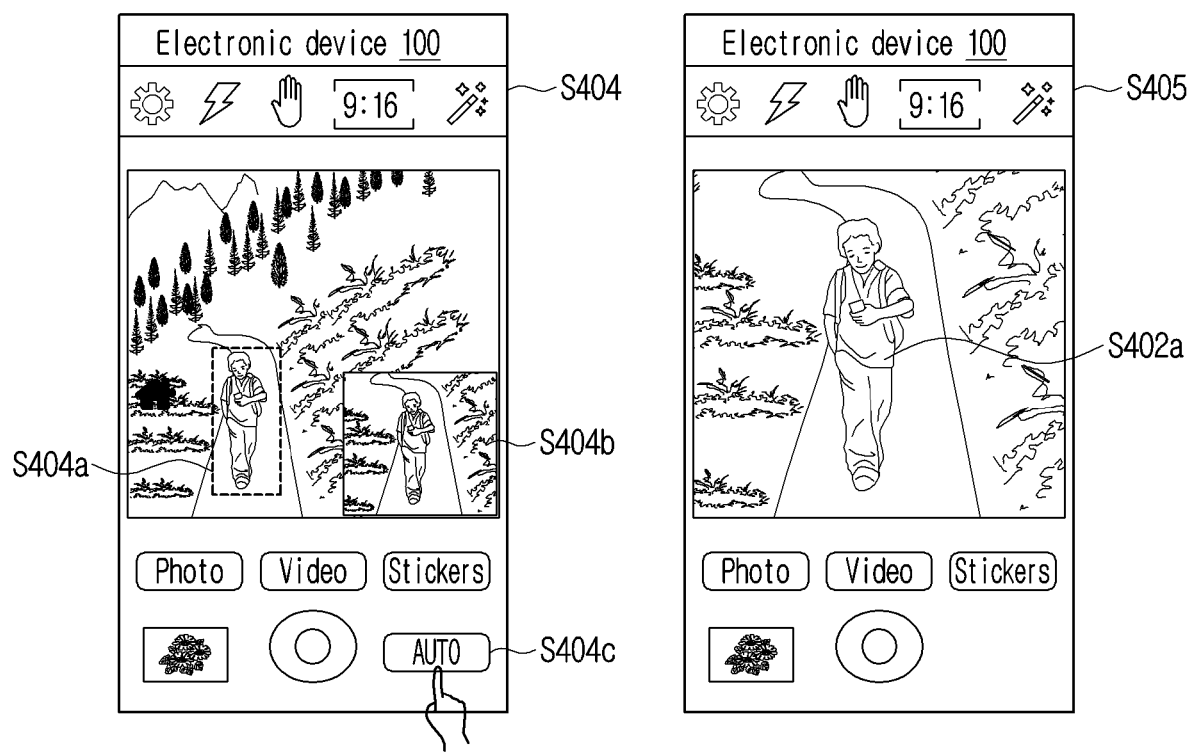

FIGS. 4A and 4B illustrate example diagrams in which the zoom suggestion is derived from the user-specific neural network model, when one object having the highest preference and closer to the center of the FOV of the preview frame, according to an embodiment of this disclosure.

Referring to the FIG. 4A, At S401, the user of the electronic device (100) wants to take a photo by using one of the camera applications of the electronic device (100). The user of the electronic device (100) opens the camera application, the camera application displays various camera modes associated with the camera application. The camera mode can be, for example, auto mode, Selfie mode, High Dynamic Range (HDR) mode, bokeh mode, beauty face mode, etc. Further, the camera (160) is configured to display the preview of the scene (401a) on the screen (i.e. display (140)) of the electronic device (100) by utilizing feeds of the multiple cameras (160) of the electronic device (100). At S402, the scene (401a) comprising the plurality of objects (e.g. user (402a), tree (402b), house (402c)) in the preview frame of the imaging sensor of the camera (160) of the electronic device (100).

At S403, the preference generator (171) determines the preference for each of the objects by mapping each of the objects into the preference database (e.g. a plurality of images (403a) including a plurality of objects captured by the user of the electronic device (100) over the period of time) of the electronic device (100) using the ML engine (172). Further, the ML engine (172) generates the preference value (403b) (e.g. user (402a)'s score: "4", tree (402b)'s score: "1", house (402c)'s score: "1") for each the object based on the multiple correlations of each object in the image in connection with the frequency of capture, the semantic relationship among the objects and the plurality of capture parameters associated with each image.

Referring to FIG. 4B, At S404, the view priority controller (173) detects the object from the plurality of objects having the highest preference (e.g. user (402a)'s score: "4") using the ML engine (172). Further, the view priority controller (173) determines whether the object having the highest preference is one of: in center of the FOV of the preview frame, and closer to the center of the FOV of the preview frame in comparison to remaining objects from the plurality of objects. Further, the view priority controller (173) selects the object having the highest preference (e.g. user (402b)'s score: "4") in response to determining that the object is one of: in center of the FOV of the preview frame, and closer to the center of the FOV of the preview frame in comparison to the remaining objects from the plurality of objects. Further, the image processing controller (174) draws the bounding box (S404b) around the portion of the selected object (402b). Further, the image processing controller (174) applies the visual effect (S404b) on the portion of the selected object (402b). The visual effect (S404b) includes a preview of the selected object (402b). Further, the image processing controller (174) displays the ticker (S404c) (e.g. zoom button) corresponding to the selected object (402b). The user of the electronic device (100) has to click the ticker (S404c) to capture the image of the selected object (402a).

At S405, the image processing controller (174) performs the zoom-in operation towards the selected object (402a), where the object selected by the view priority controller (173). Further, the image processing controller (174) performs the zoom-in operation till the selected object (402b) is not going beyond the FOV of the preview frame of the image sensor of the camera (160) of the electronic device (100).

Figure 5:
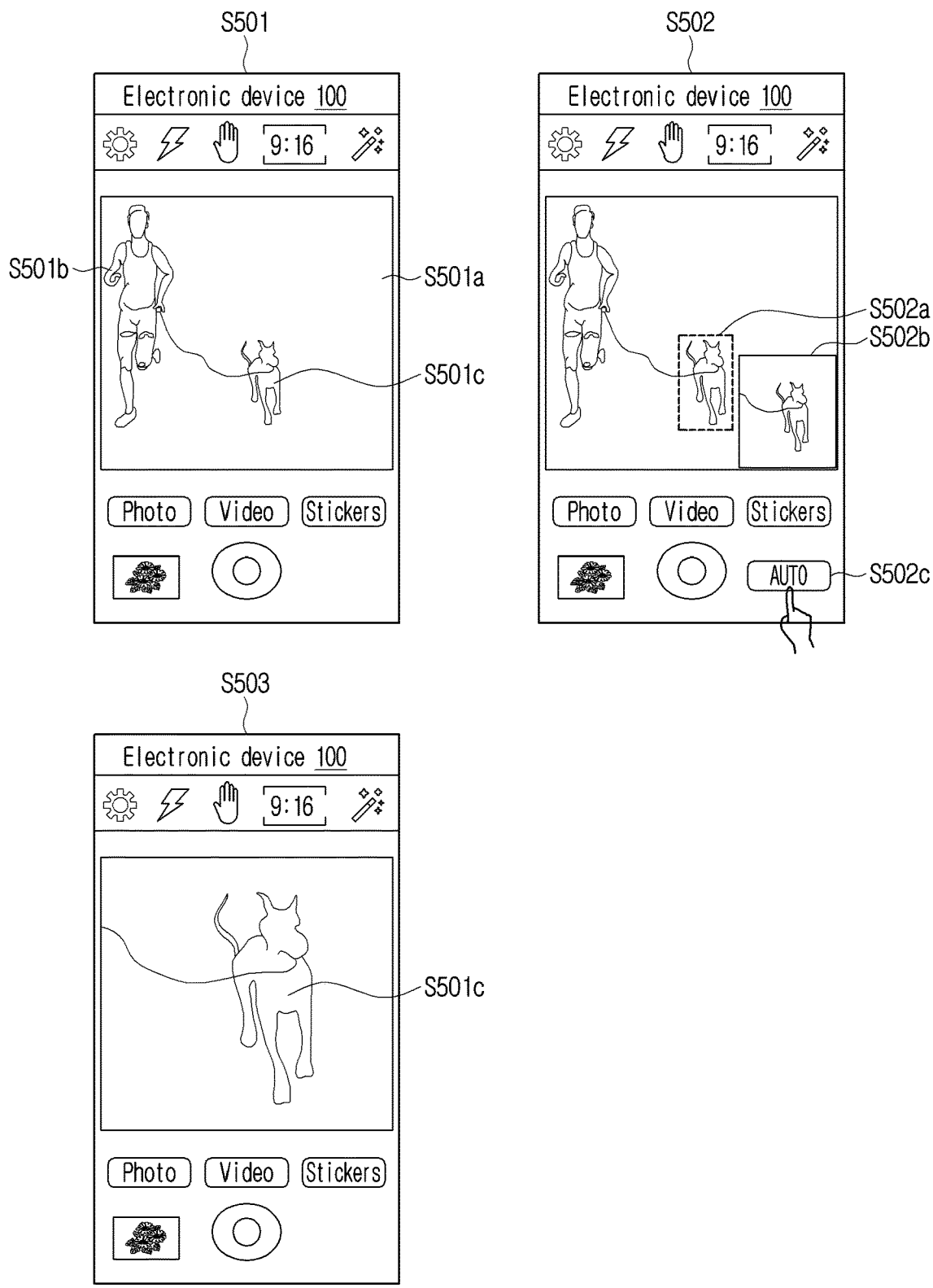
FIG. 5 illustrates an example diagrams in which the zoom suggestion is derived from the user-specific neural network model, when one object having the highest preference and far to the center of the FOV of the preview frame, according to an embodiment of this disclosure.

FIG. 5 illustrates an example diagrams in which the zoom suggestion is derived from the user-specific neural network model, when one object having the highest preference and far to the center of the FOV of the preview frame, according to an embodiment of this disclosure.

Referring to the FIG. 5, At S501, the user of the electronic device (100) wants to take a photo by using one of the camera applications of the electronic device (100). The user of the electronic device (100) opens the camera application, the camera application displays various camera modes associated with the camera application. Further, the camera (160) is configured to preview the scene (501b) on the screen of the electronic device (100) by utilizing feeds of the multiple cameras (160) of the electronic device (100). The scene (501b) comprising the plurality of objects (e.g. user (501b), pet (501c)) in the preview frame of the imaging sensor of the camera (160) of the electronic device (100). Further, the preference generator (171) determines the preference for each of the objects by mapping each of the objects into the preference database (e.g. plurality of images (403a) including the plurality of objects captured by the user of the electronic device (100) over the period of time) of the electronic device (100) using the ML engine (172). Further, the ML engine (172) generates the preference value (e.g. user (501b)'s score: "4", pet (501c)'s score: "3") for each object based on the multiple correlations of each object in the image in connection with the frequency of capture, the semantic relationship among the objects and the plurality of capture parameters associated with each image.

At S502, the view priority controller (173) detects the object from the plurality of objects having the highest preference (e.g. user (501b)'s score: "4") using the ML engine (172). Further, the view priority controller (173) determines whether the object having the highest preference is one of: in center of the FOV of the preview frame, and closer to the center of the FOV of the preview frame in comparison to the remaining objects from the plurality of objects. Further, the view priority controller (173) selects a second object having the next highest preference (e.g. pet (501c)'s score: "3") and is one of: in center of the FOV of the preview frame and is closer to the center of the FOV of the preview frame in comparison to the remaining objects from the plurality of objects, in response to determining that the object having the highest preference is one of: not in the center of the FOV of the preview frame, and not closer to the center of the FOV of the preview frame in comparison to the remaining objects from the plurality of objects.

At S502, the image processing controller (174) draws the bounding box (S502a) around the portion of the selected object (501c). Further, the image processing controller (174) applies the visual effect (S502b) on the portion of the selected object (501c). The visual effect (S502b) includes the preview of the selected object (501c). Further, the image processing controller (174) displays the ticker (S502c) (e.g. zoom button) corresponding to the selected object (501c). The user of the electronic device (100) has to click the ticker (S502c) to capture the image of the selected object (501c).

At S503, the image processing controller (174) performs the zoom-in operation towards the selected object (501c), where the object selected by the view priority controller (173). Further, the image processing controller (174) performs the zoom-in operation till the selected object (501c) is not going beyond the FOV of the preview frame of the image sensor of the camera (160) of the electronic device (100).

Figure 6A:
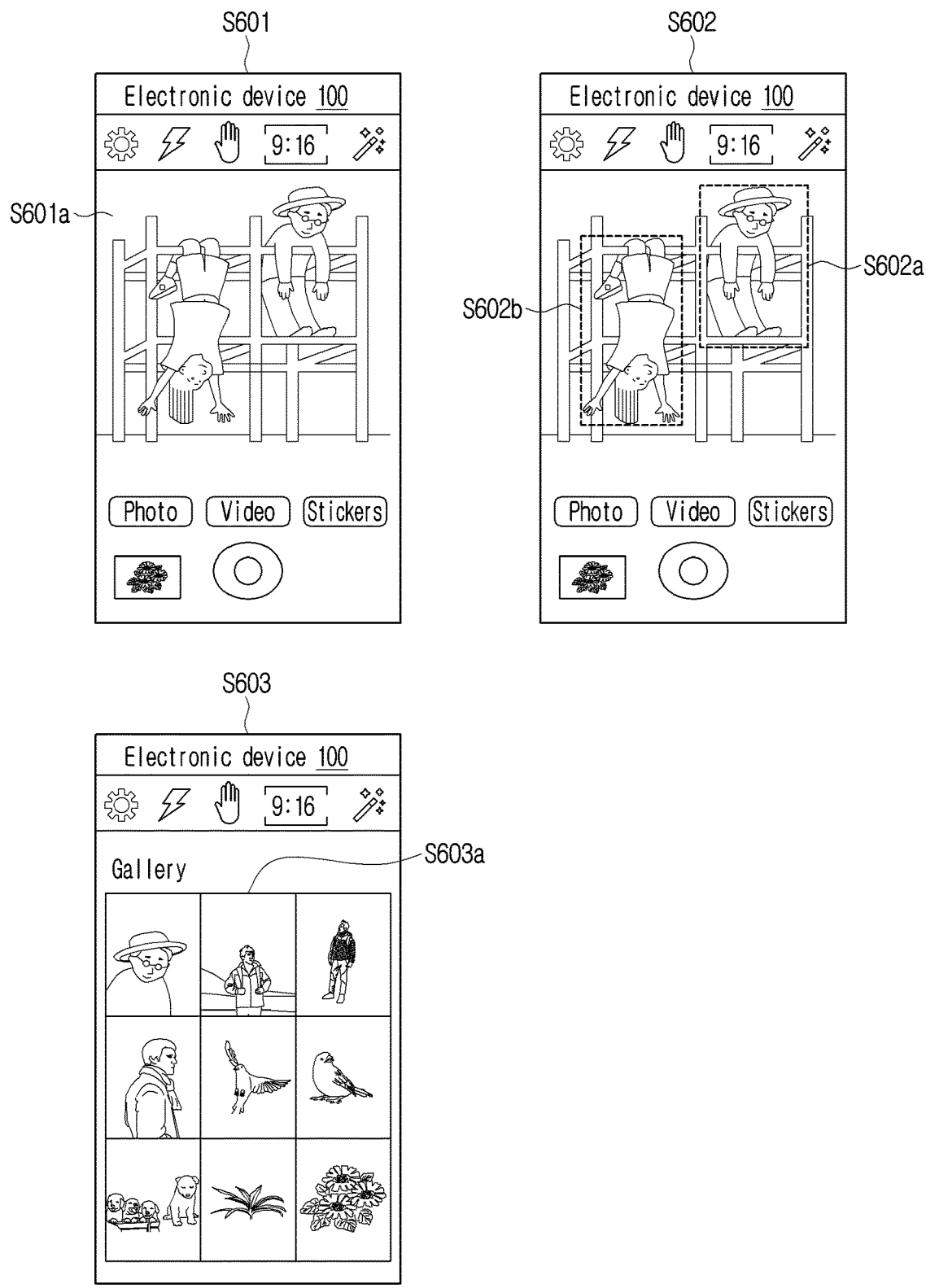
FIG. 6A and FIG. 6B illustrate example diagrams in which the zoom suggestion is derived from the user-specific neural network model, when one object having the highest preference and closer to the center of the FOV of the preview frame, according to an embodiment of this disclosure.
Figure 6B:
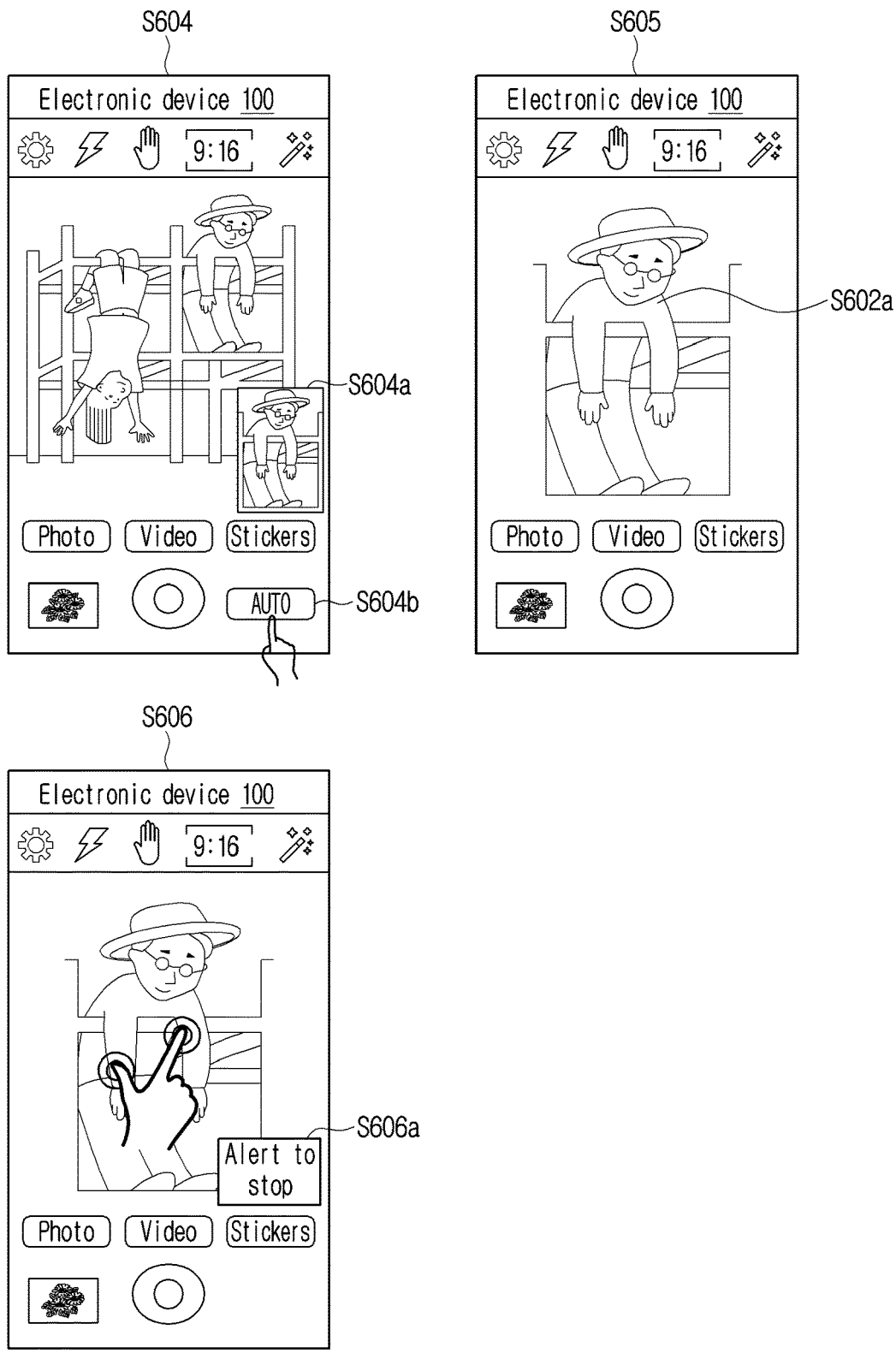

FIGS. 6A and 6B illustrate example diagrams in which the zoom suggestion is derived from the user-specific neural network model, when one object having the highest preference and closer to the center of the FOV of the preview frame, according to an embodiment of this disclosure.

Referring to the FIG. 6A, At S601, the user of the electronic device (100) wants to take a photo by using one of the camera applications of the electronic device (100). The user of the electronic device (100) opens the camera application, the camera application displays various camera modes associated with the camera application. Further, the camera (160) is configured to display the preview of the scene (601a) on the screen (i.e. display (140)) of the electronic device (100) by utilizing feeds of the multiple cameras (160) of the electronic device (100). At S602, the scene (401a) comprising the plurality of objects (e.g. user-A (602a), user-B (602b)) in the preview frame of the imaging sensor of the camera (160) of the electronic device (100).

At S603, the preference generator (171) determines the preference for each of the objects by mapping each of the objects into the preference database (e.g. plurality of images (603a) including the plurality of objects captured by the user of the electronic device (100) over the period of time, the plurality of images (603a) associated with the application repository (150)) of the electronic device (100) using the ML engine (172). Further, the ML engine (172) generates the preference value (e.g. user-A (602a)'s score: "10", user-B (602b)'s score: "2") for each object based on the multiple correlations of each object in the image in connection with the frequency of capture, the semantic relationship among the objects and the plurality of capture parameters associated with each image.

Referring to the FIG. 6B, At S604, the view priority controller (173) detects the object from the plurality of objects having the highest preference (e.g. user-A (602a)'s score: "10") using the ML engine (172). Further, the view priority controller (173) determines whether the object having the highest preference is one of: in center of the FOV of the preview frame, and closer to the center of the FOV of the preview frame in comparison to remaining objects from the plurality of objects. Further, the view priority controller (173) selects the object having the highest preference (e.g. user-A (602a)'s score: "10") in response to determining that the object is one of: in center of the FOV of the preview frame, and closer to the center of the FOV of the preview frame in comparison to the remaining objects from the plurality of objects. Further, the image processing controller (174) draws the bounding box around the portion of the selected object (602a). Further, the image processing controller (174) applies the visual effect (S604a) on the portion of the selected object (602a). The visual effect (S604a) includes the preview of the selected object (602a). Further, the image processing controller (174) displays the ticker (S604b) (e.g. zoom button) corresponding to the selected object (602a). The user of the electronic device (100) has to click the ticker (S604b) to capture the image of the selected object (602aa).

At S605, the image processing controller (174) performs the zoom-in operation towards the selected object (602a), where the object is selected by the view priority controller (173). Further, the image processing controller (174) performs the zoom-in operation till the selected object (602a) is not going beyond the FOV of the preview frame of the image sensor of the camera (160) of the electronic device (100).

At S606, the user of the electronic device (100) pinch to zoom in more, that time the image processing controller (174) automatically displays the alert to stop (606a) performing the zoom-in operations in response to determining that the portion of the selected object is going beyond the FOV of the preview frame of the image sensor of the camera (160) of the electronic device (100).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for displaying an intelligent zoom recommendation in an electronic device, comprising:
   displaying, by the electronic device, a scene comprising a plurality of objects in a preview frame of at least one imaging sensor of the electronic device;
   determining, by the electronic device, a zoom preference for each of the objects by mapping each of the objects into a preference database of the electronic device, wherein the preference database comprises predetermined information about different objects and corresponding zoom preferences;
   determining, by the electronic device, a position of each of the objects in the preview frame of the at least one imaging sensor of the electronic device;
   selecting, by the electronic device, at least one object from the plurality of objects based on the zoom preference and the position of each of the objects; and
   displaying, by the electronic device, at least one graphical indication to zoom the at least one selected object in the preview frame of the at least one imaging sensor of the electronic device,
   wherein displaying, by the electronic device, the at least one graphical indication to zoom the at least one selected object in the preview frame of the at least one imaging sensor of the electronic device comprises applying a visual effect on a portion of the at least one selected object,
   wherein the visual effect comprises a preview window of the at least one selected object, and
   wherein the preview window is displayed in an area of the preview frame.

2. The method of claim 1, further comprises:
   detecting, by the electronic device, a zoom-in operation performed to zoom the at least one selected object;
   detecting, by the electronic device, whether at least one portion of the at least one selected object is going beyond a field of view (FOV) of the preview frame of the at least one imaging sensor of the electronic device; and
   automatically displaying, by the electronic device, an alert to stop performing the zoom-in operations in response to determining that the at least one portion of the at least one selected object is beyond the FOV of the preview frame of the at least one imaging sensor of the electronic device.

3. The method of claim 1, wherein selecting, by the electronic device, the at least one object from the plurality of objects based on the zoom preference and the position of each of the objects comprises:
   detecting, by the electronic device, the at least one object from the plurality of objects with a highest zoom preference;
   determining, by the electronic device, whether the at least one object with the highest zoom preference is at least one of in center of an FOV of the preview frame or closer to the center of the FOV of the preview frame in comparison to remaining objects from the plurality of objects; and
   performing, by the electronic device, at least one of:
      selecting the at least one object with the highest zoom in response to determining that the at least one object is at least one of in center of the FOV of the preview frame, or closer to the center of the FOV of the preview frame in comparison to the remaining objects from the plurality of objects; or
      selecting at least one-second object with a next highest zoom preference and is at least one of in center of the FOV of the preview frame or closer to the center of the FOV of the preview frame in comparison to the remaining objects from the plurality of objects, in response to determining that the at least one object with the highest zoom preference is at least one of not in the center of the FOV of the preview frame, or not closer to the center of the FOV of the preview frame in comparison to the remaining objects from the plurality of objects.

4. The method of claim 1, wherein displaying, by the electronic device, the at least one graphical indication to zoom the at least one selected object in the preview frame of the at least one imaging sensor of the electronic device comprises at least one of:
  drawing a bounding box around a portion of the at least one selected object, and
  displaying a ticker corresponding to the at least one selected object.

5. The method of claim 1, further comprises generating the preference database, wherein generating the preference database comprises:
  monitoring, by the electronic device, a plurality of images including a plurality of objects captured by a user of the electronic device over a period of time;
  generating, by the electronic device, a zoom preference value for each the object based on at least one of an object detection, an object recognition, a frequency of capture, a semantic relationship among the objects, or a plurality of capture parameters associated with each image; and
  storing, by the electronic device, the generated zoom preference in the preference database.

6. The method of claim 5, wherein a plurality of capture parameters associated with each image comprises a configuration of the at least one imaging sensor, a mode applied to capture the images, an effect applied while capturing the images.

7. The method of claim 5, wherein the zoom preference value is generated by a neural network based on multiple correlations of each object in a first image.

8. An electronic device for displaying an intelligent zoom recommendation, the electronic device comprising:
  a memory;
  a processor; and
  an intelligent zoom controller, operably connected to the memory and the processor, configured to:
    display a scene comprising a plurality of objects in a preview frame of at least one imaging sensor of the electronic device,
    determine a zoom preference for each of the objects by mapping each of the objects into a preference database of the electronic device, wherein the preference database comprises predetermined information about different objects and corresponding zoom preference,
    determine a position of each of the objects in the preview frame of the at least one imaging sensor of the electronic device,
    select at least one object from the plurality of objects based on the zoom preference and the position of each of the objects, and
    display at least one graphical indication to zoom the at least one selected object in the preview frame of the at least one imaging sensor of the electronic device,
  wherein the at least one graphical indication comprises applying a visual effect on a portion of the at least one selected object,
  wherein the visual effect comprises a preview window of the at least one selected object, and
  wherein the preview window is displayed in an area of the preview frame.

9. The electronic device of claim 8, wherein the intelligent zoom controller is further configured to:
  detect a zoom-in operation performed to zoom the at least one selected object;
  detect whether at least one portion of the at least one selected object is going beyond a field of view (FOV) of the preview frame of the at least one imaging sensor of the electronic device; and
  automatically display an alert to stop performing the zoom-in operations in response to determining that the at least one portion of the at least one selected object is beyond the FOV of the preview frame of the at least one imaging sensor of the electronic device.

10. The electronic device of claim 8, wherein to select the at least one object from the plurality of objects based on the zoom preference and the position of each of the objects, the intelligent zoom controller is configured to:
  detect the at least one object from the plurality of objects with a highest zoom preference;
  determine whether the at least one object with the highest zoom preference is at least one of in center of an FOV of the preview frame, or closer to the center of the FOV of the preview frame in comparison to remaining objects from the plurality of objects; and
  perform at least one of:
    select the at least one object with the highest zoom preference in response to determining that the at least one object is at least one of in center of the FOV of the preview frame, or closer to the center of the FOV of the preview frame in comparison to the remaining objects from the plurality of objects; or
    select at least one-second object with a next highest zoom preference and is at least one of in center of the FOV of the preview frame or closer to the center of the FOV of the preview frame in comparison to the remaining objects from the plurality of objects, in response to determining that the at least one object with the highest zoom preference is at least one of not in the center of the FOV of the preview frame, or not closer to the center of the FOV of the preview frame in comparison to the remaining objects from the plurality of objects.

11. The electronic device of claim 8, wherein the at least one graphical indication comprises at least one of:
  a bounding box around a portion of the at least one selected object, and
  a ticker corresponding to the at least one selected object.

12. The electronic device of claim 8, wherein the intelligent zoom controller is further configured to generate the preference database, to generate the preference database the intelligent zoom controller is configured to:
  monitor a plurality of images including a plurality of objects captured by a user of the electronic device over a period of time;
  generate a zoom preference value for each the object based on at least one of an object detection, an object recognition, a frequency of capture, a semantic relationship among the objects or a plurality of capture parameters associated with each image; and
  store the generated zoom preference value in the preference database.

13. The electronic device of claim 12, wherein a plurality of capture parameters associated with each image comprises a configuration of the at least one imaging sensor, a mode applied to capture the images, an effect applied while capturing the images.

14. The electronic device of claim 12 wherein a neural network is configured to generate the zoom preference value based on multiple correlations of each object in a first image.

15. A non-transitory computer readable medium embodying a computer program, the computer program comprising computer readable program code that when executed by a processor of an electronic device causes the processor to:
  display a scene comprising a plurality of objects in a preview frame of at least one imaging sensor of the electronic device;
  determine a zoom preference for each of the objects by mapping each of the objects into a preference database of the electronic device, wherein the preference database comprises predetermined information about different objects and corresponding zoom preferences;
  determine a position of each of the objects in the preview frame of the at least one imaging sensor of the electronic device;
  select at least one object from the plurality of objects based on the zoom preference and the position of each of the objects; and
  display at least one graphical indication to zoom the at least one selected object in the preview frame of the at least one imaging sensor of the electronic device,
  wherein the at least one graphical indication comprises applying a visual effect on a portion of the at least one selected object,
  wherein the visual effect comprises a preview window of the at least one selected object, and
  wherein the preview window is displayed in an area of the preview frame.

16. The non-transitory computer readable medium of claim 15, wherein the computer program further comprises computer readable program code that, when executed by the processor, causes the processor to:
  Detect a zoom-in operation performed to zoom the at least one selected object;
  detect whether at least one portion of the at least one selected object is going beyond a field of view (FOV) of the preview frame of the at least one imaging sensor of the electronic device; and
  automatically displaying an alert to stop performing the zoom-in operations in response to determining that the at least one portion of the at least one selected object is beyond the FOV of the preview frame of the at least one imaging sensor of the electronic device.

17. The non-transitory computer readable medium of claim 15, wherein to select the at least one object from the plurality of objects the computer program further comprises computer readable program code that, when executed by the processor, causes the processor to:
  detect the at least one object from the plurality of objects with a highest zoom preference;
  determine whether the at least one object with the highest zoom preference is at least one of in center of an FOV of the preview frame or closer to the center of the FOV of the preview frame in comparison to remaining objects from the plurality of objects; and
  perform at least one of:
    select the at least one object with the highest zoom preference in response to determining that the at least one object is at least one of in center of the FOV of the preview frame, or closer to the center of the FOV of the preview frame in comparison to the remaining objects from the plurality of objects; or
    select at least one-second object with a next highest zoom preference and is at least one of in center of the FOV of the preview frame or closer to the center of the FOV of the preview frame in comparison to the remaining objects from the plurality of objects, in response to determining that the at least one object with the highest zoom preference is at least one of not in the center of the FOV of the preview frame, or not closer to the center of the FOV of the preview frame in comparison to the remaining objects from the plurality of objects.

18. The non-transitory computer readable medium of claim 15, wherein the at least one graphical indication comprises at least one of:
  a bounding box around a portion of the at least one selected object, and
  a ticker corresponding to the at least one selected object.

19. The non-transitory computer readable medium of claim 15, wherein the computer program further comprises computer readable program code that, when executed by the processor, causes the processor to generating the preference database, wherein to generate the preference database the computer program further comprises computer readable program code that, when executed by the processor, causes the processor to:
  monitor a plurality of images including a plurality of objects captured by a user of the electronic device over a period of time;
  generate a zoom preference value for each the object based on at least one of an object detection, an object recognition, a frequency of capture, a semantic relationship among the objects, or a plurality of capture parameters associated with each image; and
  store the generated zoom preference value in the preference database.

20. The non-transitory computer readable medium as claimed in claim 19, wherein a plurality of capture parameters associated with each image comprises a configuration of the at least one imaging sensor, a mode applied to capture the images, an effect applied while capturing the images.

* * * * *